April 24, 1928.  1,667,342
J. B. BLAW
PORTABLE FIRE NOZZLE SUPPORT
Filed Jan. 24, 1924
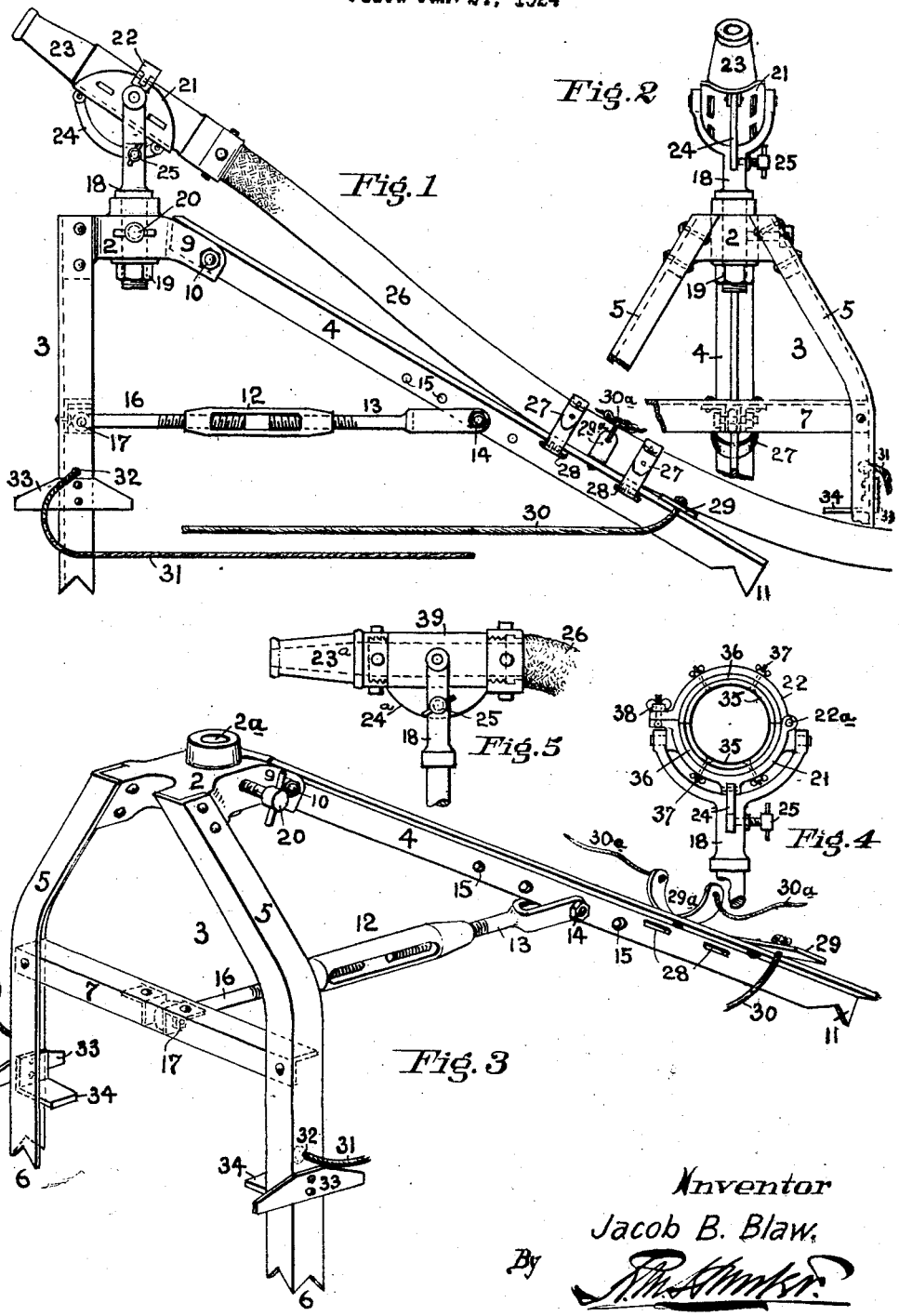
Inventor
Jacob B. Blaw,
By
Attorney.

Patented Apr. 24, 1928.

1,667,342

UNITED STATES PATENT OFFICE.

JACOB B. BLAW, OF ATLANTIC CITY, NEW JERSEY; SADIE H. BLAW EXECUTRIX OF SAID JACOB B. BLAW, DECEASED.

PORTABLE FIRE-NOZZLE SUPPORT.

Application filed January 24, 1924. Serial No. 688,151.

The main object of my invention is to provide a portable fire nozzle support which may be easily and quickly adapted, under various conditions incident to most fires, to position a fire hose and nozzle whereby, not only is the strain of the nozzle in action largely removed from the hosemen, but the adjustment of the nozzle is permitted to insure the stream being delivered just where needed and to be retained in any position of adjustment with a minimum of attention on the part of the firemen.

More especially, my invention comprises a hose and nozzle support which has adaptability for firm attachment to floors, to fire-escapes, and to the ground, together with capacity for universal adjustment of the fire nozzle, and by use of which one man may perform the work heretofore requiring several men. Moreover, a fire nozzle may be supported and set, with the use of my invention, to direct a stream where needed for a considerable period of time and left to itself with assurance that it will continue to perform the desired function.

In general, the invention comprises an adjustable tripod frame having at its upper portion a universally adjustable nozzle or yoke supporting part for the fire nozzle, the tripod having its two forward legs spread apart and rigidly connected together and with a head block in which the nozzle support or yoke is journaled in an upright bearing therein, and its rear leg preferably hinged to the head block and extending rearwardly at great obliquity and connected with the legs first mentioned by a tie rod (preferably adjustable), the lower portions or ends of the several legs each having suitable means for attachment to a floor or fire escape of a building or even upon the bare ground, all of which features are fully described hereinafter.

As a further refinement of my invention, the fire nozzle may have adjustment in a vertical plane in substantial alinement with the rearwardly extending leg of the tripod frame, so that the hose may be supported by said leg and be fastened thereto against danger of shifting and whereby the hose, nozzle and tripod support become, in effect, a unitary apparatus capable of being adjustably anchored to place of use, and yet quickly shifted in position should such be advisable or necessary.

As a further feature of improvement, the legs near their lower ends are provided with transverse bars or shoulder portions projecting from the continuous walls of the legs, for supporting the tripod frame on metal fire-escapes, as described hereinafter, said bars or legs preferably provided with ropes or straps by which the tripod frame may be securely attached or positioned when in use.

In the preferred form of my invention, I provide the rear leg of the tripod frame with a spiked end and a socket for receiving and holding the hose against lateral displacement, flexible means such as straps or ropes being employed for preventing the hose rising out of the socket; and, moreover, the fire nozzle may be directly hinged to the supporting yoke and provided on one end with a detachable nozzle and, at the other end, with a coupling for connection with the hose.

My invention further embodies details of construction which, together with the features above specified, are described hereinafter and more specifically defined in the claims.

Referring to the drawings: Fig. 1 is a side elevation of my improved fire nozzle and hose support; Fig. 2 is a front elevation of a portion of the same; Fig. 3 is a perspective view of the tripod frame with the nozzle and supporting means removed; Fig. 4 is a front view of one form of nozzle supporting yoke and clamp; and Fig. 5 is a side elevation of a combined nozzle and supporting yoke forming a part of my invention.

3 is the front of the tripod and comprises the two legs 5, 5, connected together by cross bar 7 and also rigidly connected at their upper ends to the forward part of a head block 2, all of which are rigidly connected as to form, in effect, a substantially integral structure. The lower ends of the legs 5 are arranged at quite a distance apart and are shaped with teeth as at 6, whereas the upper ends are brought closer together where they are connected with the head block 2. The rear portion 9 of the head block is slotted and receives the web of a T bar 4 which constitutes an oblique rear leg or strut 4. This leg 4 is hinged to the portion 9 of the head block by the transverse bolt 10 whereby it may be adjusted relatively to the head block and front leg portions.

A suitable tie bar of a turn-buckle construction, comprising the parts 12, 13, 16, may be employed for adjustably connecting the rear leg 4 with the transverse bar 7 of the front leg portion. The threaded shank 16 is hinged at 17 to the transverse bar 7 and the threaded shank 13 is hinged to the vertical web of the rear leg by a transverse bolt 14. The threaded portions of the shanks 13 and 16 are relatively right and left handed, so that when the coupling part 12 is rotated in one or the other direction, the tie as a whole may be lengthened or shortened, as required. Any other means for adjusting the length of the tie may be employed, if so desired. It will also be seen that the rear leg 4 is provided with a plurality of transverse holes 15 through any of which the bolt 14 may be passed for still further insuring capacity for adjustment of the rear leg.

The rear adjustable leg 4 of the tripod is notched or otherwise formed, at its lower end, into a spike 11 and where the leg is made of T iron, this spike will be upon the underweb portion, as clearly shown in Figs. 1 and 3. Near the lower end of the leg 4 there is provided a transverse bar 29 riveted in place so as to project somewhat to each side, similar in effect to the transverse plates 33 on the front leg portion 5, the function of this bar 29 being substantially the same as the plates 33, that is to say, to support the leg from extending too far down between metal work gratings, such as in fire-escapes. Somewhat above the bar 29 and also secured to the leg 4 is a U shaped socket 29$^a$ in which the hose 26 may be received and held against lateral displacement. Straps 27 passing through slots 28 in the web of the leg may be employed to hold the hose from disengaging itself from the socket 29$^a$. In place of or in addition to the straps 27, ropes 30$^a$ attached to the ends of the socket may be employed for tieing down the hose, if so desired. The bar 29 may be provided with a rope 30 by which the rear leg of the tripod may be fastened down to the fire-escape grating, if so desired, and it is evident that the said rope may be attached to any portion of the leg near its lower end above the transverse bar 29 for this tieing down of the leg portion. Similarly, the front leg portions 5 are provided with ropes 31 fastened through holes 32 just above the transverse plates 33 and by means of which the front leg portions may likewise be fastened against rising from the fire grating or place of support for the tripod. In Fig. 3, these various ropes 30, 31 and 30$^a$ are shown in abbreviated length, but, in practice, they would be of considerable length, as illustrated in Fig. 1.

18 is a Y shaped yoke for carrying the hose nozzle, the lower arm of which extends downwardly and is journaled in a vertical bearing socket 2$^a$ and is held against disengagement by means of a nut 19 screwed on its lower end, as more fully shown in Figs. 1 and 2. In Figs. 1, 2 and 4, a hose carrying socket piece or saddle 21 is hinged to the upper ends of the two arms of the yoke 18 and said saddle is provided with a curved bar 24 at its underside, curved from the transverse axis of the yoke as a center and working through a slot in the lower part of the yoke. 25 is a clamp screw carried by the yoke and adapted to clamp the curved shaped bar 24 to hold the saddle or nozzle socket in any position of adjustment desired. 22 is a clamp, hinged at 22$^a$ to one side of the saddle or socket and adapted to be clamped to the other side of the same by a clamping screw and wing nut 38, as more particularly illustrated in Fig. 4. The hose nozzle 23 rests in the saddle or socket and is firmly clamped therein by the adjustable clamp 22. As the hose nozzles vary somewhat in their diameters, I provide semi-circular filling pieces 35 which may be clamped to the saddle and to the hinged clamp portion by means of bolts 37, so that the size of the saddle and its clamp may be adjusted to suit the diameter of any particular nozzle. The yoke 18 is adjustable about an upright or vertical axis to permit the adjustment of the stream in a horizontal direction and such adjustment may be fixed by means of a clamping screw 20 carried by the head 2 and binding the lower shank of the yoke. It will be seen by this construction, that the adjustment of the yoke in a substantially horizontal plane and the adjustment of the saddle or nozzle carrying socket in a vertical plane permits universal adjustment of the nozzle to suit any requirements which may occur.

In place of using an independent nozzle, as is customary, and providing a saddle clamp to hold the same, as in Figs. 1, 2 and 4, I prefer to form the nozzle with the body part 39 directly hinged to the yoke 18, as shown in Fig. 5. To one end of this body part 39, the hose 26 is coupled, and the other end is fitted with the nozzle proper 23$^a$. With this construction, various sized nozzles may be substituted, according to the character and reach required of the stream. In this construction, the lower part of the body 39 is provided with an arc segment 24$^a$ to perform the same function as the part 24 in Fig. 1, in that it is clamped by the clamping screw 25 of the yoke to hold the nozzle in various vertical positions of adjustment. In cases where the tripod frame is fitted with the yoke and nozzle of the character illustrated in Fig. 5, and if it should be necessary to adapt the device for use with an independent hose nozzle of the character shown in Fig. 1, then and in that event, it is only necessary to remove the yoke and nozzle shown in Fig. 5, and substitute the yoke and saddle construction shown in Fig. 1, this change being quickly made and only involving the device to be supplemented by one or more additional yokes and nozzle supporting means.

As before pointed out, there are numerous possible conditions under which a portable device of this character may be used to advantage, for, aside from its attachment to a fire-escape for the purpose of throwing streams of water at buildings on the opposite side of the street or at a distance along the same side, the device may be placed upon an ordinary wood floor and the prong 11 of the rear leg 4 driven thereinto by a heavy downward thrust of the heel and thus held in position against backward movement under the re-action of the projected stream, with or without the attendance of a hoseman. And further, the device may be employed even on the ground in which the lower ends of the leg portions may be pressed into the earth and, if necessary, locked therein by earth or other means over the plates 33 and 29, to permit the continued play of streams upon a fire with a minimum attendance on the part of the firemen. In fact, the portable device is adapted to almost any kind of condition, as the front legs and rear legs can be received and braced in numerous ways and under conditions which are likely to be found with almost all large fires.

By securing the hose to the rear leg of the tripod and clamping the yoke and nozzle supporting devices to hold the nozzle in fixed relation to the head of the tripod structure, it is manifest that there is very small opportunity for disturbance of a position in which the apparatus is placed. The wide spread of the front legs 5 and the long oblique position of the rear leg gives great stability, and the prong 11 provides all the resistance necessary to prevent a backward shifting of the tripod when the stream is in play, for it will be understood that when the hose 26 is full of water under pressure, the weight of the hose and its resistance in the direction of its length becomes a great factor in insuring stability as to positioning of the structure as a whole.

While the normal adjustment of the nozzle in respect to the yoke 18 gives larger capacity for adjustment in a vertical plane, nevertheless, there may be special instances where an increased adjustment may be required and this is accomplished by the provision of the adjustable tie member 12, 13, 16, with or without the further adjustable feature of the bolt 14 with the plurality of transverse holes 15 in the rear leg. The adjustability of the rear leg is also useful in cases where the spread between the lower end of the rear leg and the front legs is too great to fit into some particular space, as on a fire-escape or passageway, as in such cases the spread may be reduced to enable the parts to be received in the small space available.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:

1. A portable fire nozzle and hose support, comprising a head block having a vertical bearing, two widely spread legs united by a cross bar and rigidly connected at their top portions to the head block so that they have a fixed relative position with respect to the vertical bearing of the head block, a rearwardly extending and obliquely arranged leg hinged at its upper end to the rear of the head block, an adjustable tie member connected at one end with the oblique leg and at its other end with the transverse bar of the front frame, an upwardly arranged yoke journaled in the bearing of the head block and having supporting means for a fire hose nozzle, and means for clamping the yoke rigidly to the head block, and in which each of the leg portions are provided with transversely extending parts projecting from the sides thereof at a distance from their lower ends to form supports for them under special conditions, said transversely extending parts arranged to project transversely to a vertical plane through the oblique leg portion.

2. The invention according to claim 1, wherein further, the several leg portions are provided with flexible means such as ropes connected with the leg portion above the bottom of the transversely extending parts for tieing the leg portions in position against rising.

3. A portable fire nozzle and hose support, comprising a head block having a vertical bearing and a rearwardly extending vertically slotted portion, a front frame formed of two angle iron legs riveted to the forward end of the head block and braced apart by a transverse bar, a rearwardly extending oblique leg portion of T-shape cross section the web thereof being arranged in the vertical slot of the head and hinged thereto on a transverse pivot, an adjustable tie formed of two parts respectively hinged to the cross bar and to the oblique leg portion and connected by a swivel nut whereby it may be extended or contracted for adjusting the oblique leg, and a hose nozzle supporting means adjustably journaled in the vertical bearing of the head block.

4. A portable fire nozzle and hose support, comprising a front frame having two widely separated legs rigidly secured together to move as a unit, a rearwardly extending oblique leg adjustable relatively to the front frame and the legs thereof, an adjustable tie member having one end connected to the rear leg and the other end to the frame having the front legs, a head block jointly supported by the front and rear leg portions, a nozzle supporting yoke journaled in the head block with provision of adjustment in substantially a horizontal plane, means for securing the yoke to the head block in different positions of adjustment, and means secured to the rearwardly extending leg for receiving and holding the hose portion which extends rearwardly from the nozzle thereby providing a plurality of widely separated points of support between the hose and nozzle on the one part and the supporting frame structure having the leg portions on the other part.

5. The invention according to claim 4, wherein the leg portions are each provided with transversely extending plates near their lower parts and projecting from opposite sides of the leg portions to constitute sustaining means where the device is employed in connection with an open-work floor.

6. A portable fire nozzle and hose support, comprising a front frame having two widely separated legs rigidly secured together to move as a unit and each having a plurality of transverse portions extending laterally therefrom at right angles and arranged at a distance from their lower ends, an adjustable rearwardly extending oblique leg having a transverse plate portion extending laterally therefrom on each side at a distance from its lower end, a head block jointly supported by the front and rear leg portions, an adjustable means for adjusting the oblique leg relatively to the front legs, and a nozzle supporting yoke journaled in the head block with provision for adjustment in a substantially horizontal plane, said transverse portions of the legs constituting sustaining means where the device is employed in connection with an open-work floor.

7. The invention according to claim 6, wherein further, the leg portions are each provided adjacent to the lateral extending plates with flexible portions such as ropes for tieing the leg portions down to the open-work floor upon which they may be supported when the fire nozzle is in use.

In testimony of which invention, I hereunto set my hand.

JACOB B. BLAW.